United States Patent [19]

Canivet

[11] Patent Number: 4,548,664
[45] Date of Patent: Oct. 22, 1985

[54] METHOD OF INJECTING A VISCOUS FILLER MATERIAL INTO FIBER-RECEIVING GROOVES IN THE CORE OF AN OPTICAL FIBER CABLE

[75] Inventor: Jean-Luc Canivet, Oye Plage, France

[73] Assignee: Les Cables de Lyon, France

[21] Appl. No.: 632,173

[22] Filed: Jul. 19, 1984

[30] Foreign Application Priority Data

Jul. 27, 1983 [FR] France ............................. 83 12409

[51] Int. Cl.⁴ ..................... B65H 81/02; G02B 5/14
[52] U.S. Cl. ..................................... 156/166; 57/7;
156/185; 156/244.12; 264/1.5
[58] Field of Search ............ 156/48, 166, 171, 244.12,
156/185, 187, 188, 500; 264/1.5, 1.6, 103, 271.1,
272, 328.2, 328.1; 425/542; 57/7; 350/96.23;
427/118

[56] References Cited

U.S. PATENT DOCUMENTS

| 4,205,899 | 6/1980 | King et al. ........................ 364/1.5 |
| 4,354,732 | 10/1982 | Arnaud et al. ................... 350/96.23 |
| 4,381,140 | 4/1983 | Hoek .................................. 350/96.23 |
| 4,408,828 | 10/1983 | Le Noane et al. ............... 350/96.23 |
| 4,422,889 | 12/1983 | Trezeguet et al. .............. 350/96.23 |
| 4,435,238 | 3/1984 | Smith ................................. 350/96.23 |
| 4,474,426 | 10/1984 | Yataki ............................... 350/96.23 |

FOREIGN PATENT DOCUMENTS 3225228  1/1983  Fed. Rep. of Germany .
2082790A  3/1982  United Kingdom .
2105059A  3/1983  United Kingdom .

Primary Examiner—Michael Ball
Attorney, Agent, or Firm—Sughrue, Mion, Zinn, Macpeak, and Seas

[57] ABSTRACT

A method of injecting a viscous filler material into fiber-receiving grooves in the core (1) of an optical fiber cable, the method comprising the steps of: winding a first tape (5) spirally around the fiber-containing core and leaving gaps between adjacent turns of the said first tape; passing the taped core through a calibrated bore (12) of slightly greater diameter; injecting (11) viscous filler material into the said bore at a pressure chosen in relation to the speed of progress of the core through the bore to ensure that the filler material passes through the gaps between the adjacent turns of the tape to completely fill the volume of the grooves that is unoccupied by the fibers, but without the filler material being able to extend back along the grooves upstream from the point of injection; and winding a second tape spirally around the core containing both the fibers and the filler material in its grooves, said second tape being wound so as to close the gaps between the turns of the first tape.

3 Claims, 3 Drawing Figures

METHOD OF INJECTING A VISCOUS FILLER MATERIAL INTO FIBER-RECEIVING GROOVES IN THE CORE OF AN OPTICAL FIBER CABLE

The present invention relates to a method of injecting a viscous filler material into fiber-receiving grooves in the core of an optical fiber cable.

BACKGROUND OF THE INVENTION

German published patent specification No. 3,225,228 describes passing a helically-grooved cable core through a unit for filling the grooves with a viscous filler material, such as a petroleum jelly, polyisobutylene, or a silicone jelly, then placing optical fibers on the open sides of the grooves, and then burying the fibers by passing the core through a part of smaller diameter including an escape orifice upstream therefrom for evacuating excess viscous material. The grooved core is then surrounded by a metal tube which is shaped by a funnel and then longitudinally welded.

Such a method does not enable the optical fibers to be placed in the grooves with a degree of slack to protect them against mechanical stresses to which the cable may be subjected while being handled and laid. A known manner of ensuring that optical fibers have such a desired degree of slack is to subject the core to tensile forces that elongate the core while the optical fibers are being inserted in the grooves. The tensile force is then removed, the cable core shortens and the fibers are then slackly received in the grooves. The tensile force or traction may be applied by means of a unit for stretching the cable between two caterpillar track arrangements. The tension disappears downstream from the second track arrangement. However, if the grooves are filled with viscous material upstream from a pulling track arrangement, there is a risk of the core slipping, and if the viscous material is inserted while hot, the mechanical properties of the core are also affected.

Preferred implementations of the present invention provide a method of injecting a viscous material during the manufacture of optical fiber cables which ensures that the grooves are rapidly filled with viscous material while the optical fibers are at a distance from the bottoms of the grooves, ie. while the fibers have the desired degree of slack since the core has left the tracked tensioning unit. Such implementations also prevent the viscous material from escaping upstream from its point of injection which would have the undesirable effect of urging the fibers backwards along their grooves and possibly damaging them.

SUMMARY OF THE INVENTION

The present invention provides a method of injecting a viscous filler material into fiber-receiving grooves in the core of an optical fiber cable, the method comprising the steps of:

winding a first tape spirally around the fiber-containing core and leaving gaps between adjacent turns of the said first tape;

passing the taped core through a calibrated bore of slightly greater diameter;

injecting viscous filler material into the said bore at a pressure chosen in relation to the speed of progress of the core through the bore to ensure that the filler material passes through the gaps between the adjacent turns of the tape to completely fill the volume of the grooves that is unoccupied by the fibers, but without the filler material being able to extend back along the grooves upstream from the point of injection; and winding a second tape spirally around the core containing both the fibers and the filler material in its grooves, said second tape being wound so as to close the gaps between the turns of the first tape.

Preferably, the gaps between adjacent turns of the first tape are chosen to be small enough to prevent the optical fibers from being able to escape through the gaps to form loops outside the periphery of the core.

Advantageously, a small excess quantity of viscous filler material is injected into the calibrated bore in addition to the quantity needed to fill the grooves, said excess quantity being allowed to escape through the wall of the calibrated bore at a point downstream from the point of injection, but upstream from the exit point of the cable core from the calibrated bore.

The invention also provides apparatus for performing the above-defined method, the said apparatus comprising:

a first taping machine for winding a first tape around the cable core with gaps between adjacent turns of the tape;

an injector including a calibrated bore of slightly greater diameter than the cable core, said injector including an injection orifice for receiving the viscous filler material and an adjustable nozzle for adjusting the rate of filler material injection through the said orifice; and a second taping machine for winding a second tape around the cable core to cover the gaps between the turns of the first tape.

Preferably, the injector includes a cable core outlet fitted with a sealing ring, and slightly upstream therefrom an escape outlet for excess filler material.

BRIEF DESCRIPTION OF THE DRAWINGS

An underwater optical fiber cable and an injector for injecting a water-repellent material into the grooves in the cable core are described by way of example with reference to the accompanying drawings, in which:

FIG. 3 is a diagram of an assembly line for optical fiber cables up to the point where a second spiral tape is wound over a first spiral tape.

MORE DETAILED DESCRIPTION

Figure 1:
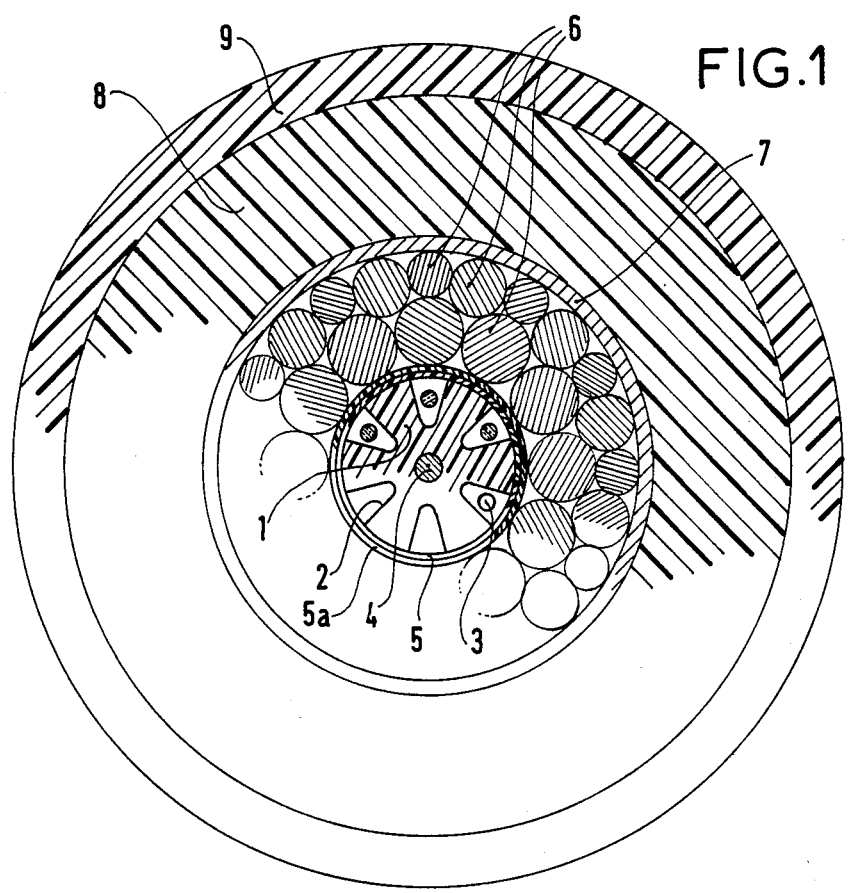
FIG. 1 is a cross section through an optical fiber cable.

In the cross section of FIG. 1 it can be seen that a cable comprises a core 1 of thermoplastic material having six helical grooves 2, each of which receives an optical fiber 3 and each of which is filled with a hydrophobic viscous material such as a silica gel. The plastic core 1 has an axial strength member 4. The core is surrounded by two successive layers 5 and 5A of tape made from ethylene glycol polyterephthalate. Anticrushing protective armor in the form of an arch structure of steel wires 6 of differing diameters is disposed around the tape. The steel wires are compressed inside a sheath of copper 7 which is swaged down onto the wires. The copper sheath 7 is surrounded by a dielectric layer 8 of low density polyethylene, which is itself protected by an outer sheath 9 of high density polyethylene.

Figure 2:
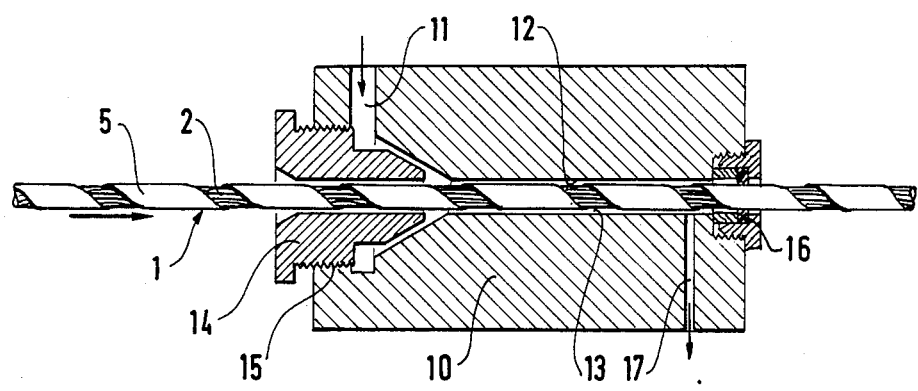
FIG. 2 is a longitudinal section through an injector with the cable passing therethrough.

FIG. 2 shows the core 1 with its grooves 2 surrounded by a first tape 5 which is wound around the core in such a manner as to leave a gap of 5 to 10 mm between adjacent turns. A viscous water-repellent material 10 is injected into the grooves by means of an injector which includes an admission orifice 11 by admitting the material under controlled pressure from a pump (28 in FIG. 3). The injector has a central bore 12 of a diameter which is greater than the diameter of the core by a few tenths of a millimeter, thus leaving an annular gap 13. A nozzle 14 at the core arrival end of the injector has an adjusting screw thread 15 which mates with a tapped bore at the end of the injector to adjust the degree to which the nozzle penetrates into the injector, thereby adjusting the rate at which the viscous material comes into contact with the core. At the core-outlet end of the injector there is a sealing ring 16 calibrated to the diameter of the core to prevent excess viscous material present in the bore 12 from covering the surface of the core outside the injector. There is also an escape outlet 17 through which excess viscous material can be recovered. The speed at which the core advances through the injector in operation may be from a few meters per minute to about 20 to 30 meters/minute.

As can be seen in FIG. 3, the core 1 is unwound from a supply drum 20, and is pulled by a first tracked arrangement 22, with jerks due to unwinding being damped by a multiple roll shoe 21. The core than passes through a laying machine 23 which lays the optical fibers in the grooves of the core. The core together with the optical fibers is then passed through a taping machine 24 which winds the first tape 5 around the core leaving a gap of about 5 to 10 mm between adjacent turns of tape. The core with its first tape then passes through a first tensiometer 25, a second tracked pulling arrangement 26, and a second tensiometer 27. Thereafter the cable passes through the injector 10 for injecting the viscous water-repellent material under the action of an injector pump 28. A second taping machine 29 then winds a second tape 5a around the core with its grooves filled with viscous water-repellent material and covers the gaps between the turns of the first tape. Thereafter, the core covered by the two tapes is taken up on a storage drum 30.

I claim:

1. A method of injecting a viscous filler material into fiber-receiving grooves in the core of an optical fiber cable, the method comprising the steps of:

winding a first tape spirally around the fiber-containing core and leaving gaps between adjacent turns of the said first tape;

passing the taped core through a calibrated bore of slightly greater diameter;

injecting viscous filler material into the said bore at a pressure chosen in relation to the speed of progress of the core through the bore to ensure that filler material passes through the gaps between the adjacent turns of the tape to completely fill the volume of the grooves that is unoccupied by the fibers, but without the filler material being able to extend back along the grooves upstream from the point of injection; and winding a second tape spirally around the core containing both the fibers and the filler material in its grooves, said second tape being wound so as to close the gaps between the turns of the first tape.

2. A method according to claim 1, wherein the said gaps between adjacent turns of the first tape are chosen to be small enough to prevent the optical fibers from being able to escape through the gaps to form loops outside the periphery of the core.

3. A method according to claim 1, wherein a small excess quantity of viscous filler material is injected into the calibrated bore in addition to the quantity needed to fill the grooves, said excess quantity being allowed to escape through the wall of the calibrated bore at a point downstream from the point of injection, but upstream from the exit point of the cable core from the calibrated bore.

* * * * *